March 1, 1938.  C. SCHMITTUTZ  2,109,508
PROCESS FOR PRESERVING STANDING POLES
Original Filed Oct. 1, 1935
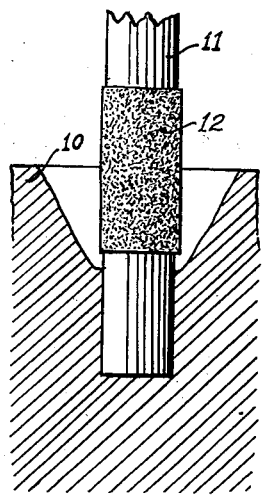
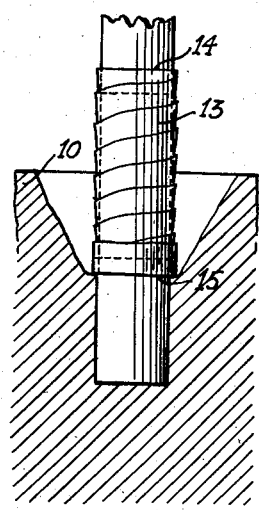
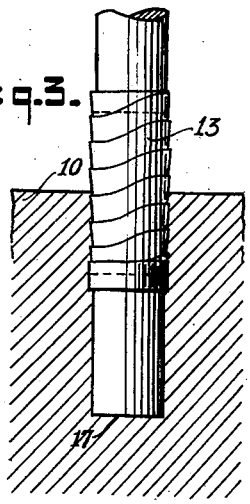
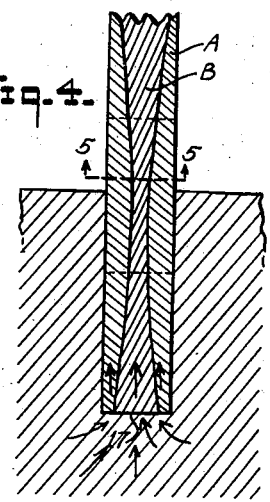
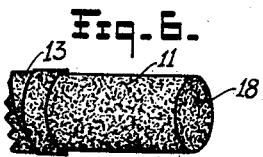
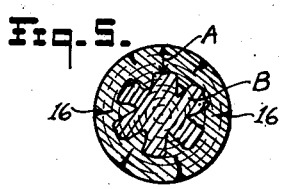
INVENTOR.
CARL SCHMITTUTZ
BY Worth Wade
ATTORNEYS.

Patented Mar. 1, 1938

2,109,508

UNITED STATES PATENT OFFICE 2,109,508

PROCESS FOR PRESERVING STANDING POLES

Carl Schmittutz, Bad Kissingen, Germany, assignor, by mesne assignments, to General Osmose Corporation, Dover, Del., a corporation of Delaware Application October 1, 1935, Serial No. 42,984. Renewed May 24, 1937. In Germany July 16, 1930

7 Claims. (Cl. 20—100)

The invention relates in general to the preservation of wood and in particular to a process for the preservation of poles, such for example as telegraph poles which are standing and in use.

The present application is a continuation in part of my copending application, Ser. No. 13,110, filed March 26, 1935.

It is a general object of the invention to provide a process for the preservation of used and standing poles by the application of a preservative to the pole in such a manner that the pole is impregnated throughout the area at the ground line without weakening the support of the pole.

It is another object of the invention to provide a process for the preservation of used and standing poles by applying to the wood a preservative in the form of a tacky paste having an ingredient adapted to penetrate the wood by osmosis to a substantial depth and an agent to bring about the intimate and uniform contact of the preservative with the wood.

It is a specific object of the invention to retard the decay of used and standing poles by treating the area in contact with the ground, the preservative being applied in such a manner as to prevent its substantial loss to the earth surrounding the pole.

Other objects of the invention will in part be obvious and will in part appear hereinafter.

According to the invention the area of the pole at and adjacent the ground line is coated with a tacky paste comprising a water-soluble preservative, a paste-forming glutinous substance and water, and the paste tightly enclosed in a waterproof covering. In the preferred embodiment of the process, the paste for the ground line treatment comprises, in addition to the above named ingredients, a protective agent comprising a water-insoluble, preferably organic, liquid which is adapted to penetrate the wood by capillary flow and form a waterproof zone to prevent the leaching out of the water-soluble preservative.

For a more complete understanding of the nature and objects of the invention, reference should be had to the accompanying drawing, in which:

Fig. 1 is a view partly in section showing a standing pole which has been treated with paste at the ground line in accordance with the invention;

Fig. 2 is a view, partly in section, showing the pole of Fig. 1, after the paste has been enclosed in a waterproof covering;

Fig. 3 is a view, partly in section, of a standing pole treated at the ground line in accordance with the invention;

Fig. 4 is a view in section of the pole of Fig. 3 after the impregnation has taken place;

Fig. 5 is a cross section of the pole of Fig. 4 taken along the line 5—5 thereof; and Fig. 6 is a view of a new pole treated preparatory to inserting it into the ground.

Referring to Fig. 1, the earth 10 is excavated from about the base of a standing pole 11 so as to expose a section of the wood about two feet below the ground line. The decayed portions of the wood may be scraped away and a layer 12 of an aqueous tacky paste containing a water-soluble preservative is completely around the pole from a point near the bottom of the excavation to a point about one foot above the normal ground line. The paste is enclosed tightly in a waterproof covering 13, which is preferably a bandage wound spirally about the pole, beginning at a point 14 well above the area covered by the paste and extending to a point 15 well below the paste, as shown in Fig. 2.

The waterproof bandage may be in the form of a flexible strip of any suitable material such as paper, leather, cloth, asbestos and which is impregnated and/or coated with a waterproofing composition such, for example, as bitumen, tar, liquid petroleum, paraffin and like. The excavation may now be filled but the earth should not extend above the top of the waterproof covering.

It should be noted that according to the present invention, the aqueous paste is applied directly to the surface of the wood and the waterproof covering is then wound directly and tightly over the paste so that the earth may be packed down tightly to support the pole adequately. Since the covering is waterproof and extends well above and below the area covered by the paste, the water-soluble compounds in the paste are prevented from leaching outwards or downwards into the ground. The moisture contained in the wood together with water carried in the paste is sufficient to cause the preservative to penetrate the wood to a substantial depth. The transpiration of water from the area of the pole exposed to the air causes water to flow from the ground into the butt 17 of the pole as shown by the arrows in Fig. 4. As the absorbed water moves upwardly in the wood it carries the preservative with it and thus the pole may be impregnated to a substantial distance above the top of the paste-coated area, as shown in Fig. 4.

For the preservative agent, there is employed a water soluble inorganic wood preservative substance such, for example, as sodium or potassium fluoride, zinc chloride. The preservative includes water soluble inorganic fungicides such, for example, as copper sulphate, potassium sulphide, mercuric chloride, zinc fluorosilicate. If desired, the preservative may comprise one or more insecticides such, for example, as a water soluble arsenic salt such as sodium or potassium arsenite, sodium or potassium arsenate. The water soluble substances may be employed either singly or in admixture. The inorganic substance should be preferably one with high solubility in water and high mobility, that is, high osmotic pressure and rate of diffusion.

Further, the invention contemplates the use of tacky pastes comprising two or more soluble inorganic wood preservative substances capable of reacting to form within the wood an insoluble or difficultly soluble product. For example, with a fluoride or an arsenate, there may be used a water soluble inorganic dichromate such as sodium or potassium dichromate. It would appear that the dichromate salt reacts with the fluoride or arsenate to form a difficultly soluble product having the general structure of a cryolite compound.

For the protective agent, there is employed an organic liquid such, for example, as dinitrophenol, dinitrocresol, tar oils, or liquid petroleum. The protective agent is preferably one which is substantially insoluble in water or incompletely miscible therewith, and which has a low viscosity and a high toxicity toward fungi and insects. The expression "water insoluble organic substance" shall include organic substances having a relatively slight solubility in water when compared to the water soluble preservative agents herein disclosed.

The paste-forming ingredient comprises preferably a glutinous substance capable of forming a water swelling colloid such, for example, as starch, dextrine, disintegrated casein, glue, gelatine, agar agar, or gum arabic. These ingredients are adapted to give a tacky paste with water and may be used singly or in admixture with each other.

In general, the preservative agent comprises from about 50% to 80%, the protective agent from about 10% to 35% and the paste-forming glutinous substance from about 5% to 30% by weight.

By way of illustration, but not by way of limiting the scope of the invention, the following examples are given, the ingredients being in parts by weight:

| Examples | I | II | III | IV | V | VI |
|---|---|---|---|---|---|---|
| Sodium fluoride | 900 | 900 | 900 | ---- | 50 | 150 |
| Sodium arsenate | ---- | ---- | ---- | 100 | 40 | ---- |
| Sodium dichromate | ---- | 350 | ---- | ---- | 35 | 70 |
| Dinitrophenol | ---- | 170 | 170 | 50 | ---- | ---- |
| Gum arabic | 130 | ---- | ---- | 30 | ---- | ---- |
| Disintegrated casein | ---- | 150 | ---- | ---- | 10 | ---- |
| Starch | ---- | ---- | 80 | ---- | ---- | 40 |

Four parts of the several ingredients above given are ground and mixed thoroughly with from four to six parts of water to give a paste of the required viscosity, and preferably one having a high degree of tackiness.

If desired, the paste may comprise a hygroscopic wetting agent such, for example, as glycerine, the glycols, calcium chloride and the like to assist in bringing the preservative and the protective agent into more intimate contact with the wood. The hygroscopicity of the wetting agent retards the drying out of the paste and continuously absorbs moisture from the air, thus prolonging the action of the preservative. There may be added also, if desired, substances adapted to color the wood or to render the same fireproof, mothproof, etc. The composition comprising a water-soluble preservative, a water-insoluble protective agent, a paste-forming glutinous substance and water above described is disclosed and claimed in my U. S. Patent No. 2,012,976, issued September 3, 1935.

The process of the invention is applicable also for treating poles preparatory to inserting them in the ground. For example, a new pole may be debarked completely or from the butt up to a point which will be well above the ground line. The debarked area at the ground line is coated with the paste above described and the paste covered tightly with a waterproof bandage as above described. Referring to Fig. 6, the butt end 17 of the pole is next coated with a layer 18 of a waterproof substance such as tar, bitumen, wax and the like, either alone or in a tacky waterproof composition, such as a mixture of wax and tar. If desired, the entire area of the pole which will be in contact with the ground, and including the area covered by the paste and bandage, may be coated with such a waterproof substance. The waterproof coating 18 closes the capillaries in the wood and prevents the loss of the water-soluble preservative by diffusion through the butt end 17 into the ground. This coating 18 also prevents the ingress of water into the wood when the ground is wet and prolongs the effective life of the water-soluble preservative in the pole. When the pole can be removed from the ground or pretreated before insertion in the ground, it is advantageous in some cases to apply the paste and bandage over the entire area of the pole which is to be in contact with the ground.

The process of the invention is applicable for the preservation of poles formed of various types of woods, such, for example, as pine, fir, spruce, larch, beech, oak, ash, gum-wood, etc. The poles when treated may be green or dried, new or used, and treated or untreated previously with preservatives. In the appended claims the expression "standing pole" is intended to include telegraph poles, fence posts, mine timbers and underpinnings, hop poles, and wooden timbers in general which have an end in contact with or embedded in the ground.

I claim:

1. In a process for preserving standing wooden poles, the steps comprising coating an area of the pole at the ground line with an aqueous tacky paste comprising a water-soluble wood preservative, a paste forming glutinous substance and water, and enclosing the coated area in a flexible waterproof bandage to prevent the loss of the preservative to the ground, the paste being applied directly to the wood and the bandage being spirally wound tightly over the paste.

2. In a process for preserving standing wooden poles, the steps comprising excavating the earth from about the base of the pole, completely coating the pole for a distance above and below the ground line with an aqueous tacky paste comprising a water-soluble wood preservative, a paste-forming glutinous substance and water, enclosing the coated area in a flexible waterproof bandage spirally wound tightly over the paste and extending substantially above and below the area coated by the paste to prevent the loss of the preservative to the ground, and back-filling the earth tightly around said pole.

3. In a process for preserving standing poles, the steps comprising coating the area of the pole at the ground line with an aqueous paste comprising a water-soluble wood preservative, a paste-forming glutinous substance and water, enclosing the coated area in a flexible waterproof covering to prevent the loss of preservative from the paste to the ground, and covering the butt of the pole with a waterproof substance to prevent the loss of preservative through the butt to the ground.

4. In a process for preserving standing poles, the steps comprising coating the area of the pole at the ground line with an aqueous paste comprising a water-soluble wood preservative, a paste-forming glutinous substance and water, enclosing the coated area in a flexible waterproof covering to prevent the loss of preservative from the paste to the ground, and covering the area of the pole which will be in contact with the ground with a waterproof substance to prevent the loss of preservative from the wood to the ground.

5. In a process for preserving standing poles, the steps comprising coating the area of the pole at the ground line with an aqueous paste comprising a water-soluble wood preservative, a paste-forming glutinous substance and water, enclosing the coated area in a flexible waterproof bandage to prevent the loss of preservative from the paste to the ground, and covering the lower end surface of the pole with a tacky waterproof composition to prevent the loss of preservative through the end to the ground.

6. In a process for preserving standing wooden poles, the steps comprising coating substantially the entire area of the pole which will be in contact with the ground with an aqueous tacky paste comprising a water-soluble preservative, a paste-forming glutinous substance and water, and enclosing the entire area coated with the paste in a flexible waterproof bandage to prevent the loss of the preservative to the ground, the paste being applied directly to the wood and the bandage being spirally wound tightly over the paste.

7. In a process for preserving standing wooden poles, the steps comprising applying to an area of the pole at the ground line an aqueous tacky paste comprising a water-soluble wood preservative, a paste-forming glutinous substance and water, and winding a bandage of a flexible waterproof material tightly over said paste, the bandage being wound from the top downward in overlapping spirals to prevent the loss of the preservative to the ground.

CARL SCHMITTUTZ.